United States Patent
Dwibedi et al.

(10) Patent No.: US 12,469,290 B2
(45) Date of Patent: Nov. 11, 2025

(54) CLASS AGNOSTIC REPETITION COUNTING IN VIDEO(S) UTILIZING A TEMPORAL SELF-SIMILARITY MATRIX

(71) Applicant: GOOGLE LLC, Mountain View, CA (US)

(72) Inventors: Debidatta Dwibedi, Santa Clara, CA (US); Yusuf Aytar, London (GB); Jonathan Tompson, San Carlos, CA (US); Andrew Zisserman, Oxford (GB); Pierre Sermanet, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 317 days.

(21) Appl. No.: 18/008,204

(22) PCT Filed: Jun. 10, 2020

(86) PCT No.: PCT/US2020/036942
§ 371 (c)(1),
(2) Date: Dec. 5, 2022

(87) PCT Pub. No.: WO2021/251959
PCT Pub. Date: Dec. 16, 2021

(65) Prior Publication Data
US 2023/0274548 A1    Aug. 31, 2023

(51) Int. Cl.
*G06V 20/40*    (2022.01)
*G06V 10/74*    (2022.01)
(Continued)

(52) U.S. Cl.
CPC ............ *G06V 20/48* (2022.01); *G06V 10/761* (2022.01); *G06V 10/771* (2022.01); *G06V 10/82* (2022.01)

(58) Field of Classification Search
CPC .... G06V 20/48; G06V 10/771; G06V 10/761; G06V 10/82
See application file for complete search history.

(56) References Cited

U.S. PATENT DOCUMENTS

2018/0336927 A1* 11/2018 Bradley ............... G11B 27/007
2019/0228313 A1    7/2019 Lee
(Continued)

FOREIGN PATENT DOCUMENTS

CN    102281385    12/2011

OTHER PUBLICATIONS

Karvounas, G., Oikonomidis, I., & Argyros, A. (2019). Reactnet: Temporal localization of repetitive activities in real-world videos. arXiv preprint arXiv:1910.06096. (Year: 2019).*

(Continued)

*Primary Examiner* — David Perlman
(74) *Attorney, Agent, or Firm* — Gray Ice Higdon

(57) ABSTRACT

Techniques are disclosed that enable processing a video capturing a periodic activity using a repetition network to generate periodic output (e.g., a period length of the periodic activity captured in the video and/or a frame wise periodicity indication of the video capturing the periodic activity). Various implementations include a class agnostic repetition network which can be used to generate periodic output for a wide variety of periodic activities. Additional or alternative implementations include generating synthetic repetition videos which can be utilized to train the repetition network.

23 Claims, 8 Drawing Sheets

(51) Int. Cl.
  *G06V 10/771* (2022.01)
  *G06V 10/82* (2022.01)

(56) References Cited

U.S. PATENT DOCUMENTS

2020/0175015 A1* 6/2020 Al Hasan .............. G06F 16/355
2020/0383623 A1* 12/2020 Wu ........................ G06F 40/35

OTHER PUBLICATIONS

Levy, O., & Wolf, L. (2015). Live repetition counting. In Proceedings of the IEEE international conference on computer vision (pp. 3020-3028). (Year: 2015).*
China National Intellectual Property Administration; Notification of First Office Action issued in Application No. 202080100900.7; 21 pages; dated Aug. 26, 2024.
European Patent Office; Communication pursuant to Article 94(3) EPC issued in Application No. 20751350.8; 6 pages; dated Dec. 2, 2024.
Sun, C. et al., "Exploring Sparseness and Self-Similarity for Action Recognition"; IEEE Transactions on Image Processing; 14 pages; dated 2015.
Vlachos, M. et al., "On periodicity detection and structural periodic similarity"; In Proceedings of the 2005 SIAM International Conference on Data Mining; pp. 449-460; dated 2005.
Wu, H-Y. et al., "Eulerian Video Magnification for Revealing Subtle Changes in the World"; ACM Transactions on Graphics (TOG) 31, No. 4; 8 pages; dated 2012.
Xie, S. et al., "Rethinking Spatiotemporal Feature Learning: Speed-Accuracy Trade-Offs in Video Classification"; In Proceedings of the European Conference on Computer Vision (ECCV), 17 pages; dated 2018.
Xie, W. "Microscopy Cell Counting and Detection With Fully Convolutional Regression Networks"; Computer Methods in Biomechanics and Biomedical Engineering: Imaging & Visualization; vol. 6, No. 3; pp. 283-292; dated 2018.
Yun, S. et al., "CutMix: Regularization Strategy To Train Strong Classifiers With Localizable Features"; arXiv.org; arXiv:1905.04899v2; 14 pages; dated Aug. 7, 2019.
Zhang, H. et al., "mixup: Beyond Empirical Risk Minimization"; arXiv.org; arXiv:1710.09412v1; 11 pages; dated Oct. 25, 2017.
Li, G. et al., "Periodic Motion Detection with ROI-based Similarity Measure and Extrema-based Reference Selection;" IEEE Transactions on Consumer Electronics, vol. 58, No. 3; 8 pages; dated Aug. 1, 2012.
Wang, K. et al., "A Regression Approach for Robust Gait Periodicity Detection with Deep Convolutional Networks;" Advances in Databases and Information Systems; Springer; pp. 164-156; Nov. 2, 2018.
Sumer, O. et al., "Self-Supervised Learning of Pose Embeddings from Spatiotemporal Relations in Videos;" 2017 IEEE International Conference on Computer Vision (ICCV); pp. 4308-4317; Oct. 22, 2017.
Hu, W. et al., "A Survey on Visual Content-Based Video Indexing and Retrieval;" IEEE Transactions on Systems, Man, and Cybernetics: Part C: Applications and Reviews, vol. 41, No. 6; pp. 797-819; Nov. 1, 2011.
Dwibedi, D. et al., "Counting Out Time: Class Agnostic Video Repetition Counting in the Wild;" IEEE/CVF Conference on Computer Vision and Pattern Recognition (CVPR); pp. 10384-10393; Jun. 13, 2020.
European Patent Office; Invitation to Pay Additional Fees; Application No. PCT/US2020/036942; 14 pages; dated Mar. 5, 2021.
European Patent Office; International Search Report and Written Opinion of Ser. No. PCT/US2020/036942; 19 pages; dated Apr. 28, 2021.
Abadi, et al.; Tensorflow: A system for Large-scale Machine Learning; In USENIX Symposium on Operating Systems Design and Implementation (OSDI), 20 Pages; dated 2016.

He, K. et al., "Deep Residual Learning for Image Recognition;" Proceedings of the IEEE Conference on Computer Vision and Patter Recognition (CVPR); pp. 770-778, dated 2016.
Hochreiter et al. "Long Short-Term Memory." Neural computation 9, No. 8 (1997): pp. 1735-1780; dated 1997.
Sermanet, P. et al., "Time-Contrastive Networks: Self-Supervised Learning from Video;" In IEEE International Conference on Robotics and Automation (ICRA); pp. 1134-1141; dated May 2018.
Sigurdsson, G.A. et al., "Hollywood in Homes: Crowdsourcing Data Collection for Activity Understanding;" Proceedings of European Conference on Computer Vision (ECCV); 17 pages; dated 2016.
Tremblay, J. et al., "Training Deep Networks with Synthetic Data: Bridging the Reality Gap by Domain Randomization;" 2018 IEEE/CVF Conference on Computer Vision and Pattern Recognition Workshops; pp. 1082-1090; dated Jun. 18, 2018.
Varol, G. et al., "Learning from Synthetic Humans;" In Conference on Computer Vision and Pattern Recognition; 9 pages; dated 2017.
Vaswani, A. et al. "Attention Is All You Need." Advances in Neural Information Processing Systems 30 (NIPS 2017), 11 pages; dated 2017.
Wang, H. et al., "Action Recognition with Improved Trajectories"; In Proceedings of the IEEE International Conference on Computer Vision; pp. 3551-3558; dated 2013.
Alayrac, JB. et al., "The Visual Centrifuge: Model-Free Layered Video Representations"; In Proceedings of the IEEE Conference on Computer Vision and Pattern Recognition; pp. 2457-2466; dated 2019.
Arteta, C. et al., "Counting in the Wild"; In European Conference on Computer Vision; Springer; pp. 483-498.; dated 2016.
Belongie, S. et al., "Structure from Periodic Motion"; In International Workshop on Spatial Coherence for Visual Motion Analysis; Springer; pp. 16-24; dated 2004.
Benabdelkader, C. et al., "EigenGait: Motion-based Recognition of People using Image Self-Similarity"; In International Conference on Audio-and Video-Based Biometric Person Authentication; 6 pages; dated 2001.
Benabdelkader, C. et al., "Gait Recognition Using Image Self-Similarity"; EURASIP Journal on Applied Signal Processing; pp. 572-585; dated 2004.
Boominathan, L. et al., "CrowdNet: A Deep Convolutional Network for Dense Crowd Counting"; In Proceedings of the 24th ACM International Conference on Multimedia; pp. 640-644; dated 2016.
Chao, Y-W. et al., "Rethinking The Faster R-CNN Architecture for Temporal Action Localization"; In Proceedings of the IEEE Conference on Computer Vision and Pattern Recognition; pp. 1130-1139; dated 2018.
Cutler, R. et al., "Robust Real-Time Periodic Motion Detection, Analysis, and Applications"; IEEE Transactions on Pattern Analysis and Machine Intelligence; vol. 22, No. 8, pp. 781-796; dated Aug. 2000.
Damen, D. et al., "Scaling Egocentric Vision: The Epic-Kitchens Dataset"; In Proceedings of the European Conference on Computer Vision (ECCV); 17 pages; dated 2018.
Dwibedi, D. et al., "Temporal Cycle-Consistency Learning"; In Proceedings of the IEEE Conference on Computer Vision and Pattern Recognition; pp. 1801-1810; dated 2019.
Dwibedi, D. et al., "Cut, Paste and Learn: Surprisingly Easy Synthesis for Instance Detection"; In Proceedings of the IEEE International Conference on Computer Vision; pp. 1301-1310; dated 2017.
Dwibedi, D. et al., "Learning Actionable Representations from Visual Observations"; In 2018 IEEE/RSJ International Conference on Intelligent Robots and Systems (IROS); 8 pages; dated 2018.
Fernando, B. et al., "Self-Supervised Video Representation Learning With Odd-One-Out Networks"; In Proceedings of the IEEE Conference on Computer Vision and Pattern Recognition; pp. 3636-3645; dated 2017.
Georgakis, G. et al., "Synthesizing Training Data For Object Detection In Indoor Scenes"; arXiv.org; arXiv:1702.07836v2; 9 pages; dated Sep. 8, 2017.

(56) References Cited

OTHER PUBLICATIONS

Gu, C. et al., "AVA: A Video Dataset of Spatio-temporally Localized Atomic Visual Actions"; In Proceedings of the IEEE Conference on Computer Vision and Pattern Recognition; pp. 6047-6056; dated 2018.
Han, T. et al., "Video Representation Learning by Dense Predictive Coding"; In Proceedings of the IEEE International Conference on Computer Vision Workshops; 10 pages; dated 2019.
Junejo, I. et al., "View-Independent Action Recognition from Temporal Self-Similarities"; IEEE Transactions On Pattern Analysis And Machine Intelligence, 33(1); 13 pages; dated 2010.
Kay, W. et al., "The Kinetics Human Action Video Dataset"; arXiv.org; arXiv:1705.06950; 22 pages; dated May 19, 2017.
Korner, M. et al., "Temporal Self-Similarity for Appearance-Based Action Recognition in Multi-View Setups"; In International Conference on Computer Analysis of Images and Patterns; Springer; pp. 163-171; dated 2013.
Kuehne, H. et al., "The Language of Actions: Recovering the Syntax and Semantics of Goal-Directed Human Activities"; In Proceedings of the IEEE Conference on Computer Vision and Pattern Recognition; 8 pages; dated 2014.
Lempitsky, V. et al., "Learning To Count Objects in Images"; In Advances in Neural Information Processing Systems; 9 pages; dated 2010.
Levy, O. et al., "Live Repetition Counting"; In Proceedings of the IEEE International Conference on Computer Vision; pp. 3020-3028; dated 2015.
Li, W. et al. "Automatic Bird Species Detection Using Periodicity of Salient Extremities"; IEEE International Conference on Robotics and Automation; pp. 5775-5780; dated May 2013.
Li, X. et al., Structure from Recurrent Motion: From Rigidity To Recurrency; In Proceedings of the IEEE Conference on Computer Vision and Pattern Recognition; pp. 3032-3040; dated 2018.
Lu, E. et al., "Class-Agnostic Counting"; In Asian Conference on Computer Vision; arXiv:1811.00472v1; 17 pages; dated 2018.
Misra, I. et al., "Shuffle and Learn: Unsupervised Learning Using Temporal Order Verification"; In European Conference on Computer Vision; Springer; pp. 527-544; dated 2016.
Niyogi, S. et al., "Analyzing Gait with Spatiotemporal Surfaces"; In Proceedings of IEEE Workshop on Motion of Non-rigid and Articulated Objects; 6 pages; dated 1994.
Panagiotakis, C. et al., "Unsupervised Detection of Periodic Segments in Videos"; In 2018 25th IEEE International Conference on Image Processing (ICIP); 5 pages; dated 2018.
Pogalin, E. et al., "Visual Quasi-Periodicity"; In 2008 IEEE Conference on Computer Vision and Pattern Recognition; 8 pages; dated 2008.
Roth, J. et al., "AVA-ActiveSpeaker: An Audio-Visual Dataset for Active Speaker Detection"; arXiv.org .; arXiv:1901.01342v2; 15 pages; dated May 25, 2019.
Runia, T. et al., "Real-World Repetition Estimation by Div, Grad And Curl"; In Proceedings of the IEEE Conference on Computer Vision and Pattern Recognition; pp. 9009-9017; dated 2018.
Seitz, S. et al., "View-Invariant Analysis of Cyclic Motion"; International Journal of Computer Vision, 25; 23 pages; dated 1997.
Shou, Z. et al., "Temporal Action Localization in Untrimmed Videos via Multi-Stage CNNs"; In Proceedings of the IEEE Conference on Computer Vision and Pattern Recognition; pp. 1049-1058; dated 2016.
Stoica, P. et al., "Spectral Analysis of Signals"; vol. 452. Upper Saddle River, NJ: Pearson Prentice Hall; 447 pages; dated 2005.
China National Intellectual Property Administration; Notification of Second Office Action issued in Application No. 202080100900.7; 8 pages; dated Mar. 15, 2025.

\* cited by examiner

CLASS AGNOSTIC REPETITION COUNTING IN VIDEO(S) UTILIZING A TEMPORAL SELF-SIMILARITY MATRIX

BACKGROUND

Repeating actions and processes are prevalent in daily life. A person stirring sugar in a cup of coffee while chewing food and tapping their feed to background music is performing at least three periodic activities in parallel. Periodic activity can be found in biological processes, manufacturing processes, human activities (e.g., exercising), object manipulation, and/or additional or alternative activities. Given the ubiquity of repetitions, understanding repetitions in videos may be helpful to a wide variety of computing systems. For example, determining repetitions can be useful to systems because (1) there is usually an intent or a driving cause behind something happening multiple times; (2) the same event can be observed again but with slight variations; (3) there may be gradual changes in a scene as a result of these repetitions; (4) they can provide unambiguous action units (e.g., a sub-sequence in the action that can be segmented in time); and/or for additional or alternative reason(s).

SUMMARY

Techniques disclosed herein are directed towards processing video capturing periodic activity, using a repetition network, to generate periodic output including (a) period length of the periodic activity and/or (b) a per frame periodicity classification (e.g., an indication of whether the periodic activity is captured in a particular frame of the video). In some implementations, the repetition network can be used to generate periodic output in a class agnostic manner. In other words, the same repetition network can be used to generate periodic output for a variety of periodic activities. For example, the repetition network can be used to generate periodic output based on a video capturing a human doing jumping jacks (i.e., a first class of periodic activity), and the same repetition network can be used to generate periodic output based on an additional video capturing a birds wings flapping (e.g., a second class of periodic activity).

In some implementations, the repetition network can include an encoder portion, which can be used to generate an encoded representation of a video. In some of those implementations, the encoded representation of the video can include an encoded representation of each fame of the video. A temporal self-similarity matrix can be generated based on the encoded representation of the video. In some implementations the self-similarity matrix can represent a shared parameterization, from which the number of repetitions of an activity can be determined. For example, the temporal self-similarity matrix can be generated by determining a pairwise similarity between all pairs of encoded video frames. Additionally or alternatively, the temporal self-similarity matrix can be processed using a period predictor model portion of the repetition network to generate a per frame period length estimation and/or a per frame binary periodicity classification.

Additional or alternative implementations are directed toward generating synthetic repetition videos, which can be used to train a repetition network, in accordance with implementations described herein. In some implementations, synthetic repetition videos can be generated based on unlabeled videos. In some implementations, the synthetic repetition videos can be generated based on video captured using an image sensor (e.g., a camera and/or additional or alternative image sensor(s)) and/or based on synthetically generated videos generated in simulation. A portion (e.g., a clip, a sequence of video frames, etc.) of an unlabeled video can be selected. This selected portion can be repeated to generate the repeated activity portion of the synthetic repetition video. Additionally or alternatively, the selected portion can be reversed, and the selected portion and the reversed selected portion can be repeated to simulate actions where the motion is also done in reverse (e.g., jumping jacks) in the synthetic repetition video. In some implementations, an additional section of the video can be prepended to the synthetic repetition video (e.g., one or more frames immediately preceding the selected clip can be prepended to the start of the synthetic repetition video). Additionally or alternatively, one or more further sections of the video can be appended to the synthetic training video (e.g., one or more frames immediately following the selected clip can be appended to the end of the synthetic repetition video).

Accordingly, various implementations set forth techniques for training a class agnostic repetition network which can be used to generate periodic output by processing a video capturing any periodic activity. In contrast, conventional techniques require training a separate network to generate periodic output for each type of periodic activity. For example, in conventional techniques, a first network is trained to generate periodic output for videos capturing people doing pushups and a second network is trained to generate periodic output for videos capturing a bird flying. Techniques described herein can utilize the same network for any type of periodic activity captured in a training video. Computing resources (e.g., processor cycles, memory, battery power, etc.) can be conserved by training a single model in place of multiple models.

Additionally or alternatively, various implementations set forth techniques for generating synthetic training data based on unlabeled videos, and utilizing synthetic training data to train a repetition model. Synthetic training data can be generated without the need for a human reviewer to identify portion(s) of a training video capturing periodic activity. Large amounts of synthetic training data can be generated quickly and cheaply, and can capture a wide variety of periodic activity. In some cases, a repetition model can be more quickly trained (i.e., trained with fewer training instances) based on synthetic training data capturing a wider variety of periodic activity. In other words, the diversity of the periodic activity captured in the training instances can be used to train the repletion model with fewer training instances.

The above description is provided only as an overview of some implementations disclosed herein. These and other implementations of the technology are disclosed in additional detail below.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
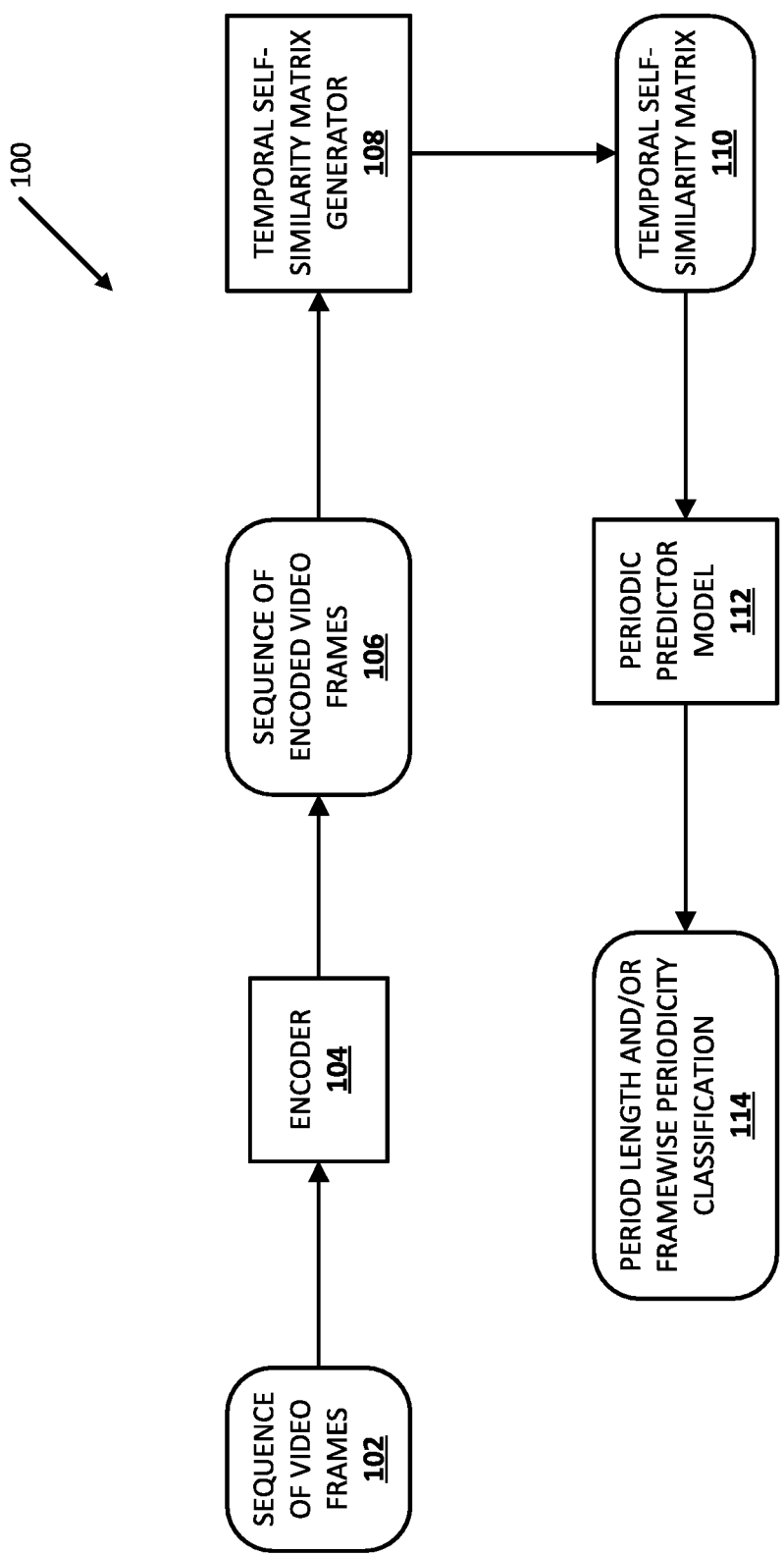
FIG. 1 illustrates an example of processing a sequence of video frames using a repetition network to generate a period length and/or a periodicity classification in accordance with various implementations disclosed herein.

The need for understanding periodic videos is pervasive. Videos of biological processes, manufacturing processes, people exercising, objects being manipulated are only a few examples where the respective fields would benefit if they were able to estimate the count and frequency of repetitions in videos automatically. Techniques described herein are directed towards an approach for estimating the period with which an action is repeated in a video. In some implementations, the crux of the approach lies in constraining the period prediction module to use temporal self-similarity as an intermediate representation bottleneck that allows generalization to unseen repetitions in videos in the wild. In some implementations, this model can be trained with a synthetic dataset that is generated from a large unlabeled video collection by sampling short clips of varying lengths and repeating them with different periods and counts. This combination of synthetic data and a powerful yet constrained model, can allow the prediction of periods in a class-agnostic fashion.

Picture the most mundane of scenes—a person eating by themselves in a cafe. They might be stirring sugar in their coffee while chewing their food, and tapping their feet to the background music. This person is doing at least three periodic activities in parallel. Repeating actions and processes are prevalent in our daily lives. In fact, biological life is driven by many such repeating phenomena happening like clockwork in cells. Given the ubiquity of repetitions, a video repetition understanding module may benefit any perceptual system that aims to observe our world for an extended period of time.

Repetitions may also be interesting for the following reasons: (1) there may be an intent or a driving cause behind something happening multiple times; (2) the same event can be observed again but with slight variations; (3) there may be gradual changes in the scene as a result of these repetitions; (4) they may provide us with unambiguous action units, a subsequence in the action that can be segmented in time (for example if you are chopping an onion, the action unit is the manipulation action that is repeated to produce additional slices). Due to the above reasons, some agents interacting with the world may benefit from such a system. Furthermore, repetition counting may be pertinent for many computer vision applications like counting the number of times an exercise was done, measurement of biological events (like heartbeats), etc.

However, research in periodic video understanding has been limited, potentially due to the lack of a large labeled repetitive video dataset. Action recognition has benefited a great deal due to the availability of a dataset of the scale of Kinetics. One aspect enabling the collection of such data at a large scale is the availability of keywords/text associated with the videos. Unfortunately it is rare for videos to be labeled with annotations related to repeated activity as the text is more likely to describe the semantic content. For this reason, techniques described herein include generating a large dataset of repetitions in videos and labeling it with the number of repetitions present in each video.

However, labeling videos with repetition counts may be tedious and expensive because of the temporally fine-grained nature of the task. In order to increase the amount of training data, techniques described herein include creating synthetic repetition videos by repeating clips from existing videos with different periods. Since we are creating these videos, we also have annotations for the period and count of repetitions in the videos, which can be used for training models using supervised learning. However, such synthetic videos may fail to capture all the nuances of real repeated videos and may be prone to over-fitting by high-capacity deep learning models. To address this issue, a data augmentation strategy for synthetic videos is proposed so that models trained on them transfer to real videos with repetitions.

In some implementations, a single model can be used for many classes of periodic videos, and indeed, also for classes of videos unseen during training. In some implementations, this can be achieved by using an intermediate representation that encourages generalization to unseen classes. This representation—a temporal self-similarity matrix—can be used to predict the period with which an action is repeating in the video. This temporal self-similarity matrix representation can be used across different kinds of repeating videos, thus enabling the desired generalization. For example, whether a person is doing pushups, or a kid is swinging in a playground, the self-similarity matrix is the shared parameterization from which the number of repetitions can be inferred. In some implementations, this (extreme) bottleneck (number of channels in the feature map reduces from 512 to 1) may also aid in generalization from synthetic data to real data. The other advantage of this representation is that model interpretability can be baked into the network architecture as the network predicts the period from the self-similarity matrix only, as opposed to inferring the period from latent high-dimensional features.

Some implementations can focus on (i) Repetition counting, identifying the number of repeats in the video. This problem can be rephrased as first estimating per frame period lengths, and then converting them to a repetition count. Additionally or alternatively, some implementations can focus on (ii) Periodicity detection, identifying if the current frame is a part of a repeating temporal pattern or not. This can be approached as a per-frame binary classification problem.

Extracting periodicity (e.g., a detection of periodic motion) and the period by leveraging the auto-correlation in time series is a well-studied problem. Period estimation in videos has been done using periodograms on top of auto-correlation or Wavelet transforms on hand-designed features derived from optical flow. The extracted periodic motion has supported multiple tasks including 3D reconstruction, and bird species classification. Periodicity has been used for various applications including temporal pattern classification.

Temporal self-similarity matrices can be useful representations for human action recognition and gait analysis due to their robustness against large viewpoint changes when paired with appropriate feature representations. Unsupervised approaches have been proposed to identify periodic segments in videos using special filters on self-similarity matrices based on Improved Dense Trajectories. Unlike these approaches, a temporal self-similarity matrix (TSM) can be an intermediate layer in neural network architecture in accordance with some implementations disclosed herein, which can act as an information bottleneck.

The use of synthetic training data in computer vision is becoming more common. Pasting object patches on real images has been shown to be effective as training data for object detection and human pose estimation. Blending multiple videos or multiple images together has been useful for producing synthetic training data for specific tasks as well as regularizing deep learning models. When synthetic data for training repetition counting was first proposed, it introduced a dataset of synthetic repeating patterns and used this to train a deep learning based counting model. However, the data used for training consists of hand-designed random patterns that do not appear realistic. These patterns may not be diverse enough to capture all the nuances of repetitions in real videos. Instead, implementations disclosed herein create a synthetic training dataset of realistic video repetitions from existing video datasets.

Counting objects and people in images is an active area in computer vision. However, video repetition counting has attracted less attention from the community in the deep learning era. Prior techniques have been used for predicting the period (cycle length), though these techniques do not use a TSM.

Repetition counting and periodicity detection can be temporally fine-grained tasks like temporal action localization, per-frame phase classification and future anticipation. In some implementations, the interfaces previously used to collect action localization datasets can be leveraged such as to create a repetition dataset Countix. In some implementations, in the repetition dataset, the extent of the periodic segments in videos and numbers of repetitions in each segment can be labeled instead of semantic segments being annotated.

In some implementations, repetition network model architecture can be composed of two learned components, the encoder and the period predictor, with a temporal self-similarity layer in between them. In some implementations, a video $V=[v_1, v_2, \ldots, v_N]$ as a sequence of N frames can be assumed. Per-frame latent embeddings $X=[x_1, x_2, \ldots, x_N]^T$ can be obtained by feeding the video V to the encoder $\phi$ as $X=\phi(V)$. Additionally or alternatively, the embeddings X can be used to obtain the self-similarity matrix S by computing pair-wise similarities $S_{ij}$ between all pairs of embeddings. Furthermore, in some implementations, S can be fed to the period predictor module which can output a per frame period length estimation $l=\psi(S)$ and/or a per frame binary periodicity classification $p=\tau(S)$.

In some implementations, the encoder can include three main components: (1) a convolutional feature extractor, (2) temporal context, and (3) dimensionality reduction. In some implementations, the convolutional feature extractor can utilize a ResNet-50 architecture as our base convolutional neural network (CNN) in order to extract 2D convolutional features from individual frames $v_i$ of the input video. These frames can be 12×12×3 in size. In some implementations, the output of a conv4_block3 layer can be used in order to have a larger spatial 2D feature map. The resulting per-frame features can be of size 7×7×1024.

These convolutional features can be passed through a layer of 3D convolutions to add local temporal information to the per-frame features. In some implementations, 512 filters of size 3×3×3 with ReLU activation can be utilized. The temporal context can help with modeling short-term motion, and can enable the model to distinguish between similar looking frames that capture different motion (e.g. hands moving up or down while exercising).

Additionally or alternatively, the dimensionality of extracted spatio-temporal features can be reduced, for example, by using Global 2D Max-pooling over the spatial dimensions, which can generate embedding vectors $x_i$ corresponding to each frame $v_i$ in the video. Collapsing the spatial dimensions can remove the need for tracking the region of interest as done explicitly in prior methods.

After obtaining latent embeddings $x_i$ for each frame $v_i$, the self-similarity matrix S can be constructed by computing all pairwise similarities $S_{ij}=\text{Sim}(x_i, x_j)$ between pairs of embeddings $x_i$ and $x_j$, where Sim(•) is a similarity function. In some implementations, the negative of the squared Euclidean distance can be used as the similarity function, $\text{Sim}(a, b)=-\|a-b\|^2$, which can be followed by a row-wise softmax operation.

In some implementations, the TSM has one channel, which can act as an information bottleneck in the middle of the network and can provide regularization. TSMs may also be interpretable which can bring further insights to the predictions made by the model.

In some implementations, the final module of the repetition network is a period predictor. This module can accept the self-similarity matrix $S=[s_1, s_2, \ldots, s_N]^T$ where each row $s_i$ is the per frame self-similarity representation. In some implementations, this module can generate a per frame period length estimation $l=\psi(S)$, and/or a per-frame binary periodicity classification $p=\tau(S)$. Both l and p can be vectors and the corresponding elements can be per frame predictions (i.e. $l_i$ is the predicted period length for the $i^{th}$ frame).

It should be noted that that predictors and x can share a common architecture and weights until the last classification phase. In some implementations, the shared processing pipeline starts with 32 2D convolutional filters of size 3×3, followed by a transformer layer (e.g., multi-headed attention followed by fully connected layers with learned positional embeddings). In some implementations, 4 heads with 512 dimensions can be utilized in the transformer. After the shared pipeline, two classifiers can be utilized, period length classifier and periodicity classifier $\tau$. In some implementations the period length classifier and/or the periodicity classifier can consist of two fully connected layers of size 512.

In some implementations, the periodicity classifier x outputs per frame periodicity classification $p_i$ and can use a binary classification loss (e.g., binary cross-entropy) for optimization. In some implementations, the period length estimator $\psi$ outputs per frame period length estimation $l_i \in L$ where the classes are discrete period lengths $$L = \left\{2, 3, \ldots, \frac{N}{2}\right\}$$

where N is the number of input frames. A multi-class classification objective (e.g., softmax cross-entropy, etc.) can be used for optimizing the model. In some implementations, N=64 can be utilized. In some of those implementations, in order to predict larger period lengths, the input video can be sampled with different frame rates as described below.

In some implementations, per-frame period length estimations can be obtained using periodic segments of a test video. The repetition count can be determined by dividing the number of frames with average estimated period length over the test video. In some implementations, the model only accepts N=64 frame inputs. Therefore, computing robust per frame period length estimations can require additional operations during inference: (1) multi-clip evaluation and/or (2) multi-speed evaluation. In multi-clip evaluation, K=15 windows of N=64 frames can be sampled (e.g., randomly sampled) from the input video. The period length estimates from the K windows can be averaged in order to predict the repetition count for a test video. Additionally or alternatively, in some implementations the model can predict period lengths up to 32. In multi-speed evaluation, to cover period longer period lengths, the input video can be sampled at different frame rates (e.g., the video can be played at 1×, 2×, 3×, 4× etc. speeds). The frame rate which has the highest score can be chosen for the predicted output.

In some implementations, a supervised approach to period estimation includes collecting a large scale training set of periodic videos and annotating the beginning and the end of every period in all repeating actions. However, collecting such a dataset can be challenging due to the fine-grained nature of the task. In some implementations, a training strategy can be utilized that makes use of synthetically generated repetitions using unlabeled videos in the wild.

In some implementations, synthetic repetition videos can be created based on a large set of unlabeled videos. An advantage of using real videos to create synthetic data can be that the resulting training data may be closer to real repeated videos when compared to using synthetic patterns. Another advantage of using real videos can be that using a big dataset can ensure that the diversity of data seen by the model is huge. This can allow the training of big complex models that can work on real repetition videos.

In some implementations, the synthetic periodic video generation pipeline can start with sampling a random video V from a dataset of videos (e.g., from a dataset of videos without any labels). Additionally or alternatively, a clip C of random length P frames can be sampled from V. The clip C can be repeated K times (where K>1) to simulate videos with repetitions. In some implementations, the clip can be reversed and concatenated before repeating, to simulate actions where the motion is done in reverse in the period (e.g., jumping jacks, the motion of a yo-yo, etc.). In some implementations, the repeating frames can be pre-prepended and/or appended with other non-repeating segments from V, which can be just before and just after C respectively. The lengths of these aperiodic segments can be chosen randomly and can potentially be zero. This operation can include both periodic and non-periodic segments in the generated video. Finally, each frame in the repeating part of the generated video is assigned a period length label P. A periodicity label can also be generated indicating whether the frame is inside or outside the repeating portion of the generated video.

In some implementations, synthetic video generation can include camera motion augmentation. Although it may not be feasible to predict views of an arbitrarily moving camera without knowing the 3D structure, occluded parts and lighting sources in the scene, it can be approximated using affine image transformations. Here the affine motion of a viewing camera over the video can be considered, which can include temporally smooth changes in rotation, translation, and scale. In some implementations, when training without these augmentations, the training loss can quickly decrease but the model may not transfer to real repletion videos. In some implementations, camera motion augmentation can be a vital part of training effective models with synthetic videos.

In some implementations, in order to achieve camera motion augmentations, the parameters for various motion types can be temporally varied in a continuous manner as the video proceeds. For example, the angle of rotation can be changed smoothly over time. This can ensure that the video is temporally coherent even after the augmentation. In some implementations, a temporal augmentation parameter can drive the viewing frame for each motion type. This can result in videos with fewer near duplicates across the repeating segments.

In some implementations, the method may be implemented in Tensorflow. The encoder can be initialized using weights from an ImageNet pre-trained ResNet-50 checkpoint. In some implementations, the model can be trained for 400K steps with a learning rate of $6\times10^{-6}$ with the ADAM optimizer and batch size of 5 videos (each with 64 frames).

Turning now to the figures, FIG. 1 illustrates an example 100 of processing a sequence of video frames using a repetition network to generate a period length and/or a periodicity classification in accordance with various implementations disclosed herein. A sequence of video frames 102 can be processed using an encoder 104 to generate a sequence of encoded video frames 106. In some implementations, the sequence of video frames 102 can capture a periodic activity (e.g., a bird flapping its wings, a human heart beating, a human stirring sugar in a cup of coffee, etc.). In some of those implementations, the sequence of video frames 102 can be directly captured using a vision sensor (e.g., a camera). Additionally or alternatively, the sequence of video frames 102 can be generated by performing preprocessing on an original video (e.g., performing preprocessing on an original video captured using a vision sensor). In some implementations, the original video may include multiple moving objects (e.g., the video can capture two or more people exercising, two or more horses galloping, a human exercising and a horse galloping, one or more additional or alternative periodic activities, and/or one or more additional non-periodic activities). For example, the original video can be preprocessed using an image processing system to track a single object (e.g., a bird flapping its wings) in each video frame.

Encoder 104 can encode each frame of the sequence of video frames 102. In some implementations, encoder 104 can include a convolutional feature extractor, a temporal context portion, a dimensionality reduction portion, and/or one or more additional or alternative portions. For example, the sequence of video frames 102 can be processed using a convolutional neural network portion of the encoder to generate two dimensional convolutional features of each of the video frames. Additionally or alternatively, the two dimensional convolutional features, of each of the video frames, can be processed using a three dimensional convolutional neural network portion of the encoder, to generate temporal context features of each of the video frames. Furthermore, the temporal context features, of each of the video frames, can be processed using a max-pooling portion of the encoder, to generate the encoded video frames.

The sequence of encoded video frames 106 can be processed using a temporal self-similarity matrix generator 108 to generate a temporal self-similarity matrix 110. In some implementations, the temporal self-similarity matrix 110 is a pairwise similarity between pairs of encoded video frames, in the sequence of encoded video frames 106. For example, the self-similarity matrix 110 can be generated, using temporal self-similarity matrix generator 108, by generating a negative squared Euclidean distance between all pairs of encoded video frames, in the sequence of encoded video frames 106. In some of those implementations, generating the negative squared Euclidean distance between all pairs of encoded video frames can be followed by a row-wise Softmax operation.

Temporal self-similarity matrix 110 can be processed using period predictor model 112 to generate a period length of the periodic activity, captured in the sequence of video frames 102, and/or a frame wise periodicity classification 114 indicating whether each video frame in the sequence of video frames 102 captures the periodic activity.

Figure 2:
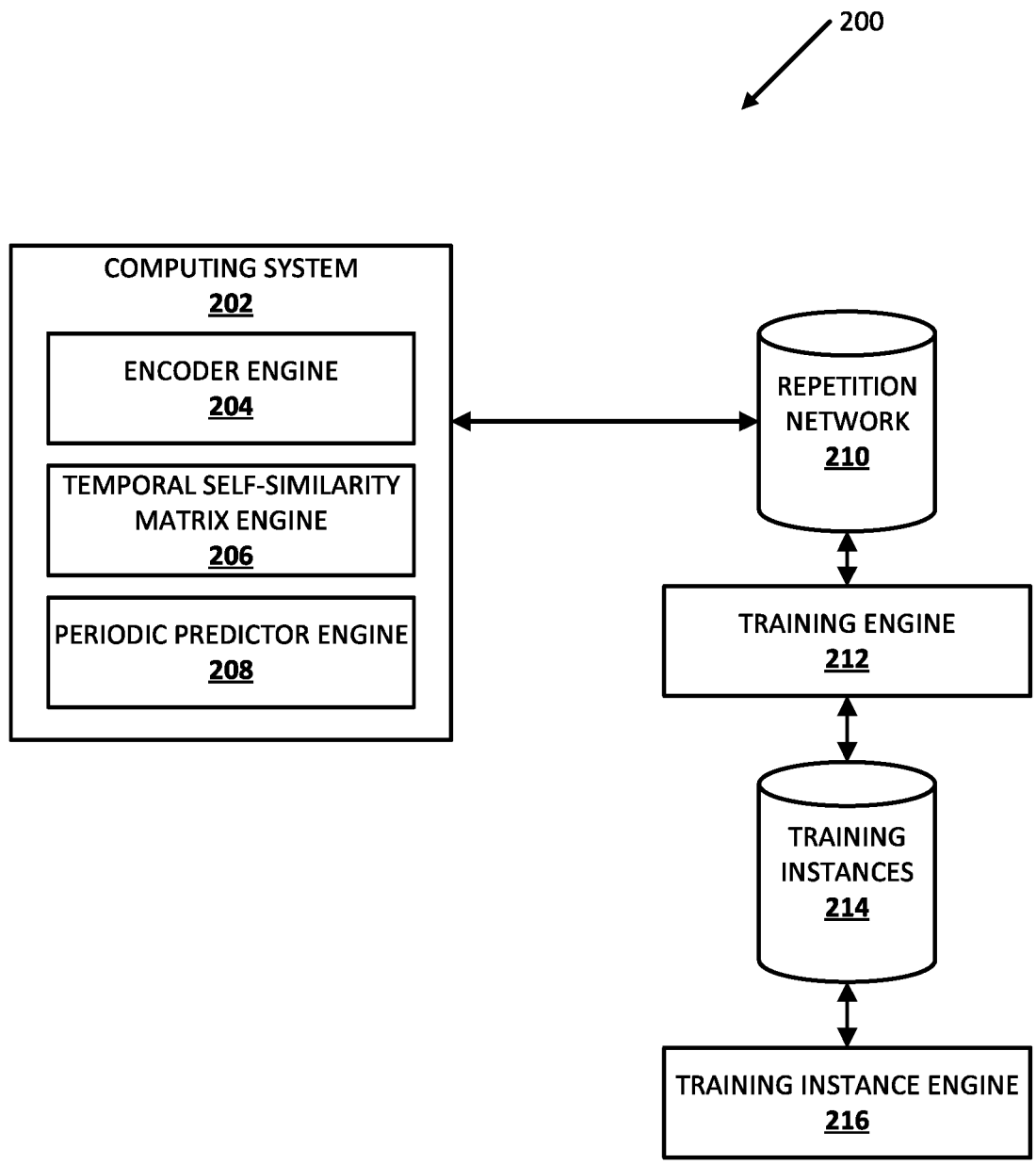
FIG. 2 illustrates an example environment in which various implementations disclosed herein may be implemented.

FIG. 2 illustrates a block diagram of an example environment 200 in which implementations disclosed herein may be implemented. The example environment 200 includes a computing system 202 which can include encoder engine 204, temporal self-similarity matrix engine 206, period predictor engine 208 and/or additional engine(s) (not depicted). Additionally or alternatively, computing system 202 may be associated with repetition network 210, training engine 212, training instances 214, training instance engine 216, and/or one or more additional or alternative components (not depicted).

In some implementations, computing system 202 may include may include user interface input/output devices (not depicted), which may include, for example, a physical keyboard, a touch screen (e.g., implementing a virtual keyboard or other textual input mechanisms), a microphone, a camera, a display screen, and/or speaker(s). The user interface input/output devices may be incorporated with one or more computing system 202 of a user. For example, a mobile phone of the user may include the user interface input output devices; a standalone digital assistant hardware device may include the user interface input/output device; a first computing device may include the user interface input device(s) and a separate computing device may include the user interface output device(s); etc. In some implementations, all or aspects of computing system 202 may be implemented on a computing system that also contains the user interface input/output devices.

Some non-limiting examples of computing system 202 include one or more of: a desktop computing device, a laptop computing device, a standalone hardware device at least in part dedicated to an automated assistant, a tablet computing device, a mobile phone computing device, a computing device of a vehicle (e.g., an in-vehicle communications system, and in-vehicle entertainment system, an in-vehicle navigation system, an in-vehicle navigation system), or a wearable apparatus of the user that includes a computing device (e.g., a watch of the user having a computing device, glasses of the user having a computing device, a virtual or augmented reality computing device). Additional and/or alternative computing systems may be provided. Computing system 202 may include one or more memories for storage of data and software applications, one or more processors for accessing data and executing applications, and other components that facilitate communication over a network. The operations performed by computing system 202 may be distributed across multiple computing devices. For example, computing programs running on one or more computers in one or more locations can be coupled to each other through a network.

As illustrated in FIG. 2, training instance engine 216 can be used to generate training instances 214. In some implementations, training instance engine 216 can be used to generate synthetic training instances 214, using unlabeled video. For example, training instance engine 216 can generate synthetic training instances in accordance with process 4A of FIG. 4A and/or process 4B of FIG. 4B described herein. In some implementations, training instance engine 216 can generate training instances 214 based on synthetic video, such as synthetic video described in FIG. 3 herein.

Training engine 212 can be used to train repetition network 210. In some implementations, training engine 212 can process one or more of training instances 214 to generate a training loss, where the training loss can be used to update one or more portions (e.g., through backpropagation) of repetition network 210. For example, a training instance 214 can include a training video capturing a training periodic activity and ground truth periodic data, where the ground truth periodic data can include the period length of the training periodic activity, a frame wise periodicity indication of the training video, and/or the number of repetitions of the periodic activity in the training video.

Encoder engine 204 can be used to process a sequence of video frames, using an encoder portion of the repetition network 210, to generate an encoded sequence of video frames. For example, the encoder engine 204 can be used to process the sequence of video frames 102, using encoder 104, to generate the sequence of encoded video frames 106 as illustrated in FIG. 1.

Temporal self-similarity matrix engine 206 can be used to process a sequence of encoded video frames, such as a sequence of encoded video frames generated using encoder engine 204, to generate a temporal self-similarity matrix. In some implementations, the temporal self-similarity matrix can be a pairwise similarity of each pair of encoded video frames in the encoded sequence of video frames. As an illustrative example, temporal self-similarity matrix engine 206, can process the sequence of encoded video frames 106, using the temporal self-similarity matrix generator 108, to generate the temporal self-similarity matrix 110 as illustrated in FIG. 1.

Period predictor engine 208 can be used to generate, using a period predictor model portion of the repetition network 210, (a) a period length of the periodic activity captured in the sequence of video frames (i.e., the sequence of video frames processed using encoder engine 204) and/or a frame wise periodicity classification of the sequence of video frames. As an illustrative example, period predictor engine 208 can be used to process temporal self-similarity matrix 110, using period predictor model 112, to generate the pairwise length and/or frame wise periodicity classification 114 as illustrated in FIG. 1.

Figure 3:
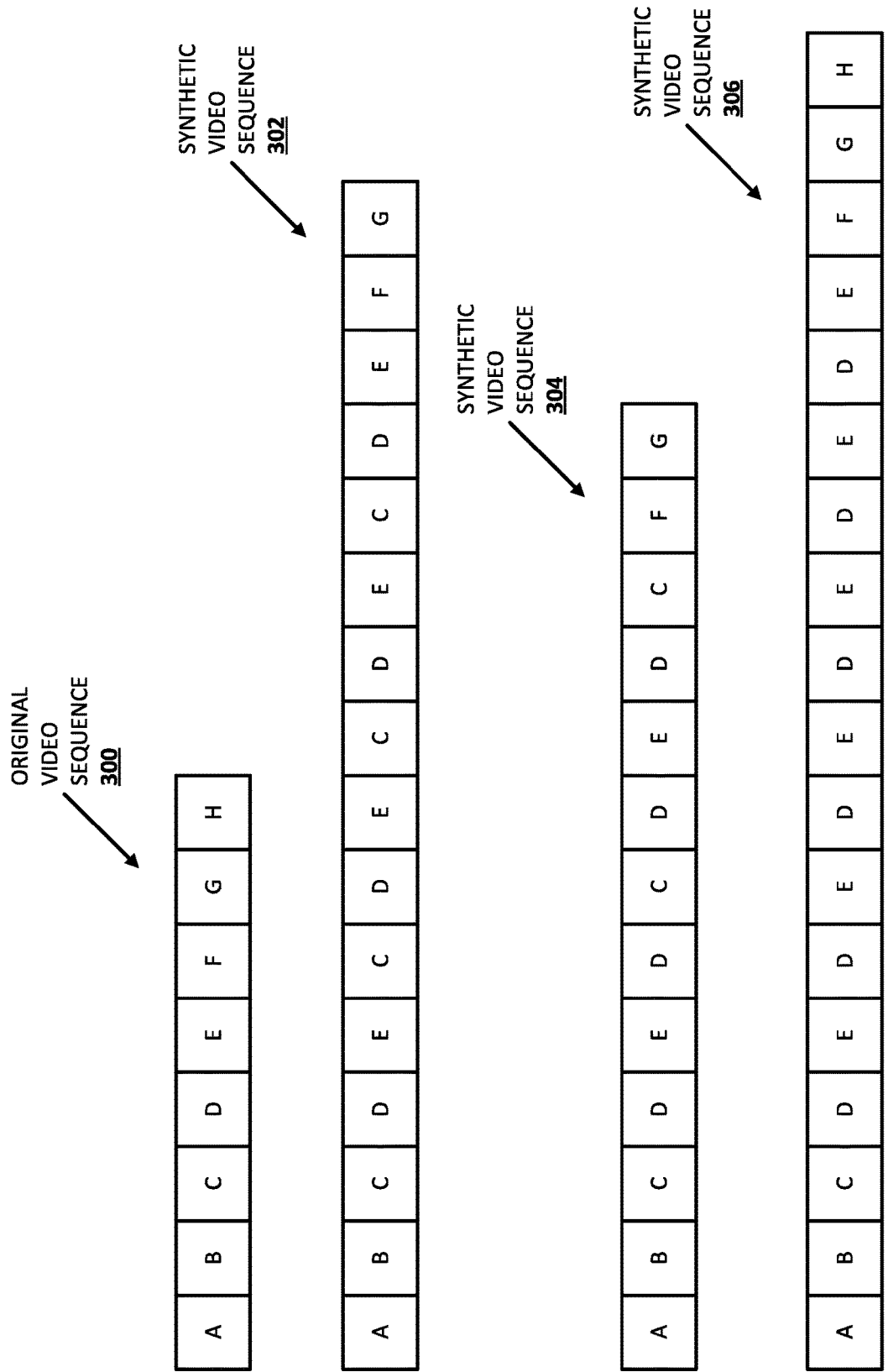
FIG. 3 illustrates synthetic repetition video sequences in accordance with various implementations disclosed herein.

FIG. 3 illustrates examples of synthetic video 302, 304, and 306, generated based on an original video sequence 300. In the illustrated example, original video sequence 300 includes a sequence of eight video frames of: 'A', 'B', 'C', 'D', 'E', 'F', 'G', 'H'.

Synthetic video sequence 302 is an example synthetic video sequence generated based on original video sequence 300 by selecting a three frame portion of the original video sequence of 'C', 'D', 'E'. The selected three frame portion of 'C', 'D', 'E' is repeated four times, to represent an activity being repeated three times. Additionally, a two frame portion of the original video of 'A', 'B', immediately preceding the selected three frame portion of 'C', 'D', 'E' is prepended to the beginning of synthetic video sequence 302. Similarly, a two frame portion of the original video 'F', 'G', immediately after the selected three frame portion of 'C', 'D', 'E', is appended to the end of synthetic video sequence 302. In some implementations, synthetic video sequence 302 can be generated in accordance with process 400 of FIG. 4A.

Synthetic video sequence 304 is another sample synthetic video sequence generated based on original video sequence 300 by selecting the three frame sequence of 'C', 'D', 'E'. Additionally, the selected sequence is reversed 'D', 'C'. The selected three frame sequence and the reversed sequence of 'C', 'D', 'E', D', 'C' is repeated twice in synthetic video sequence 304, to represent a periodic activity, such as jumping jacks, which is reversed while the action is being repeated. The two frame portion of 'A', 'B', immediately preceding the selected three frame portion of 'C', 'D', 'E' is prepended to the beginning of synthetic video sequence 304. Similarly, a two frame portion of the original video 'F', 'G', immediately after the selected three frame portion of 'C', 'D', 'E', is appended to the end of synthetic video sequence 304. In some implementations, synthetic video sequence 304 can be generated in accordance with process 450 of FIG. 4B.

Synthetic video sequence 304 is a further sample synthetic video sequence generated based on original video sequence 300. Synthetic video sequence 304 is generated by selecting the four frame sequence of 'C', 'D', 'E', 'F'. Additionally, the selected four frame sequence is reversed as 'E', 'D', 'C'. The selected four frame sequence and the reversed sequence is repeated in synthetic video sequence 306 four times, to represent a periodic activity which includes the reversal of the sequence (e.g., jumping jacks). The video frame 'C', immediately preceding the selected four frame sequence, is prepended to the beginning of synthetic video sequence 306. Additionally, the video frame 'G', immediately following the selected four frame sequence, is appended to the end of synthetic video sequence 306. In some implementations, synthetic video sequence 306 can be generated in accordance with process 450 of FIG. 4B.

Original video sequence 300 and synthetic video sequences 302, 304, and 306 are merely illustrative examples of synthetic repetition videos generated in accordance with implementations described herein. For example, additional or alternative video sequences (e.g., video sequences with fewer video frames or video sequences with more video frames) can be utilized as an original video sequence. One or more additional or alternative synthetic video sequences can be generated based on the original video sequence. For example, a different number of video frames can be selected to represent the periodic activity. Additionally or alternatively, a different number of video frames (including no video frames) can be selected to prepend and/or append to the synthetic video.

Figure 4A:
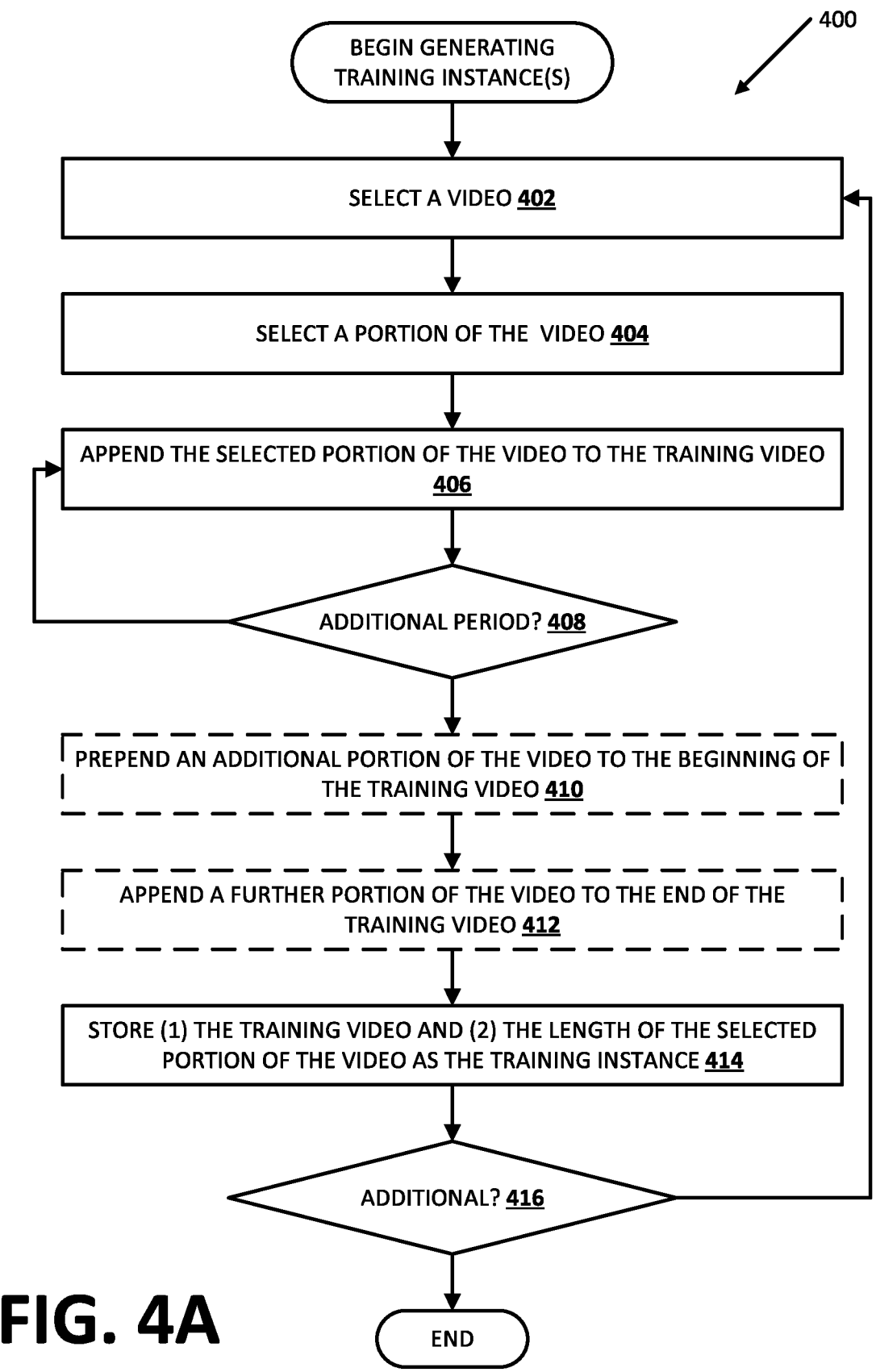
FIG. 4A is a flowchart illustrating an example process of generating synthetic training data in accordance with various implementations disclosed herein.

FIG. 4A is a flowchart illustrating an example process 400 of generating a synthetic training instance in accordance with implementations disclosed herein. For convenience, the operations of the flowchart are described with reference to a system that performs the operations. This system may include various components of various computer systems, such as one or more components of computing system 202, and/or computing system 710. Moreover, while operations of process 400 are shown in a particular order, this is not meant to be limiting. One or more operations may be reordered, omitted, and/or added.

At block 402, the system selects a video. In some implementations, the selected video is an unlabeled video. In some implementations, the selected video is a real video captured using one or more vision sensors (in contrast to a video generated in simulation). For example, the selected video can include a video of a dog eating, a human heart beating, a butterfly flying, a robot performing task(s), and/or additional or alternative activities.

At block 404, the system selects a portion of the video to represent the periodic activity. For example, the system can select a single video frame, two video frames, three video frames, four video frames, and/or additional or alternative numbers of video frames.

At block 406, the system appends the selected portion of the video to a training video.

At block 408, the system determines whether to append an additional period of the repeated activity to the training video. For example, the system can determine whether the training video satisfies one or more conditions, such as whether the training video includes a threshold value of repetitions, whether the training video exceeds a threshold size, and/or whether additional or alternative condition(s) are satisfied. If the system determines to append an additional period of the repeated activity to the video, the system proceeds back to block 406, appends an additional instance of the selected portion of the video, to the training video, before proceeding back to block 408. If not, the system proceeds to block 410.

At block 410, the system prepends an additional portion of the selected video to the beginning of the training video. In some implementations, the additional portion of the selected video can be one or more video frames immediately preceding the portion of the video selected at block 404. Additionally or alternatively, the system may not prepend any additional portion(s) of the selected video to the beginning of the training video.

At block 412, the system appends a further portion of the selected video to the end of the training video. In some implementations, the further portion of the selected video can be one or more video frames immediately following the portion of the video selected at block 404. Additionally or alternatively, the system may not append any additional portion(s) of the selected video to the end of the training video.

At block 414, the system stores, as a the training instance, the training video and (1) the length of the selected portion of the video (e.g., the number of video frames in the selected portion of the video at block 404); (2) the number of repetitions of the selected portion of the video (e.g., the number of periods appended to the training video at block 406); and/or (3) a frame wise periodicity indication (e.g., a frame wise indication of whether a video frame, in the training video, is the portion of the video selected at block 404 representing the repeated activity, or whether a video frame is prepended to the training video at block 410 and/or appended to the training video at block 412).

At block 416, the system determines whether to generate an additional training instance. In some implementations, the system can determine to generate an additional training instance based on whether one or more conditions are satisfied, such as whether a threshold number of training instances have been generated, whether there are additional video(s) to select at block 402, and/or whether one or more additional or alternative conditions has been satisfied. If the system determines to generate an additional training instance, the system proceeds back to block 402 and selects an additional video, before proceeding to blocks 404, 406, 408, 410, and 412 based on the additional selected video. If the system determines to not generate an additional training instance, the process ends.

Figure 4B:
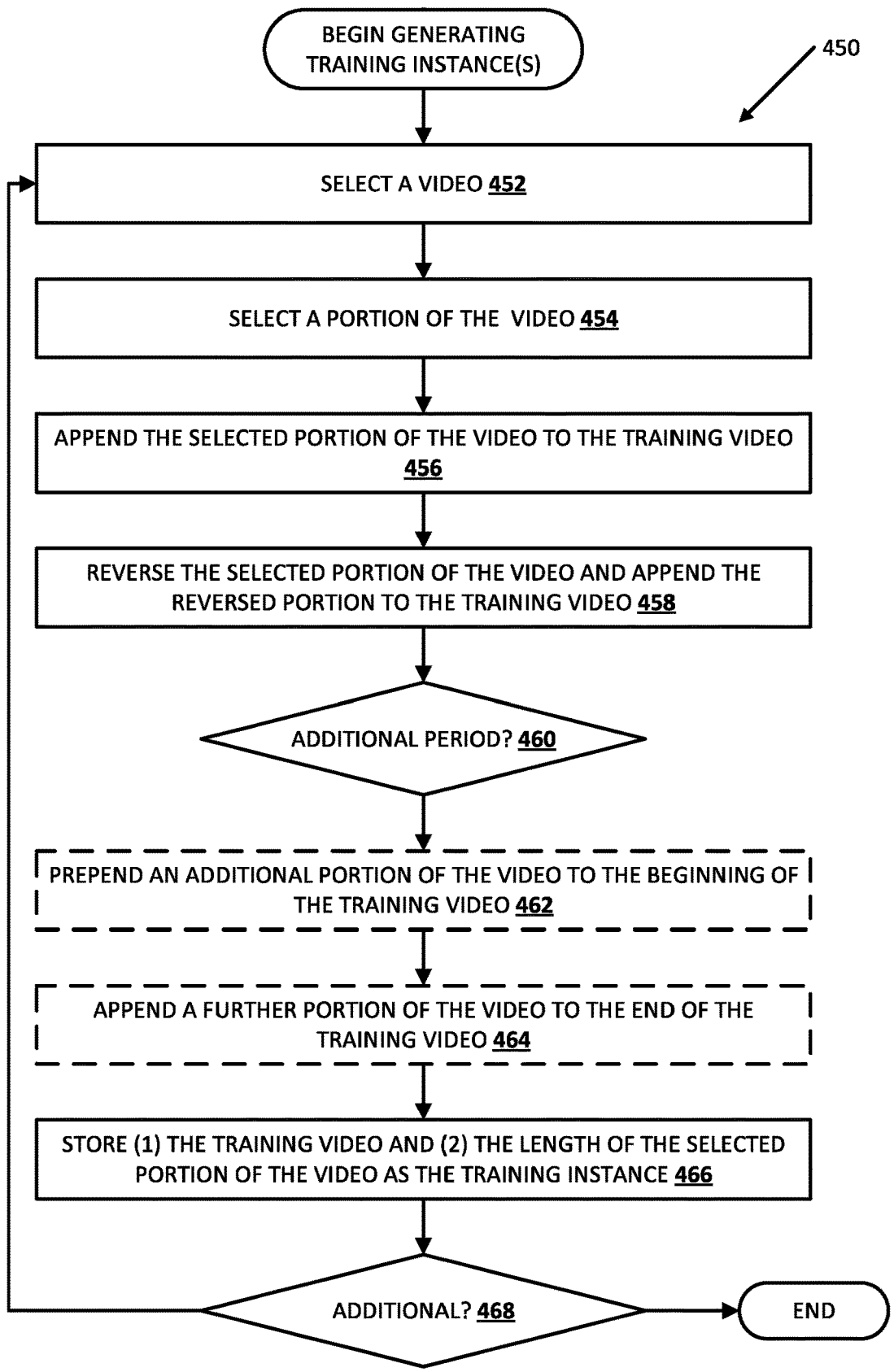
FIG. 4B is a flowchart illustrating another example process of generating synthetic training data in accordance with various implementations disclosed herein.

FIG. 4B is a flowchart illustrating an additional example process 450 of generating a synthetic training instance in accordance with implementations disclosed herein. For convenience, the operations of the flowchart are described with reference to a system that performs the operations. This system may include various components of various computer systems, such as one or more components of computing system 202, and/or computing system 710. Moreover, while operations of process 450 are shown in a particular order, this is not meant to be limiting. One or more operations may be reordered, omitted, and/or added.

At block 452, the process selects a video. In some implementations, the selected video is an unlabeled video. In some implementations, the selected video is a real video captured using one or more vision sensors (in contrast to a video generated in simulation). For example, the selected video can include a video of a dog eating, a human heart beating, a butterfly flying, a robot performing task(s), and/or additional or alternative activities.

At block 454, the system selects a portion of the video. For example, the system can select a single video frame, two video frames, three video frames, four video frames, and/or additional or alternative numbers of video frames.

At block 456, the system appends the selected portion of the video to a training video.

At block 458, the system reverses the selected portion of the video, and appends the reversed portion of the selected video to the training video.

At block 460, the system determines whether to append an additional period of the repeated activity and the reversed activity to the training video. For example, the system can determine whether the training video satisfies one or more conditions, such as whether the training video includes a threshold value of repetitions, whether the training video exceeds a threshold size, and/or whether additional or alternative condition(s) are satisfied. If the system determines to append an additional period of the repeated activity to the video, the system proceeds back to block 456, appends an additional instance of the selected portion of the video, to the training video, proceeds to block 458, appends the reverse of the selected portion of the video, to the training video, before proceeding back to block 460. If not, the system proceeds to block 462.

At block 462, the system prepends an additional portion of the video to the beginning of the training video. In some implementations, the additional portion of the selected video can be one or more video frames immediately preceding the portion of the video selected at block 454. Additionally or alternatively, the system may not prepend any additional portion(s) of the selected video to the beginning of the training video.

At block 464, the system appends a further portion of the video to the end of the training video. In some implementations, the further portion of the selected video can be one or more video frames immediately following the portion of the video selected at block 454. Additionally or alternatively, the system may not append any additional portion(s) of the selected video to the end of the training video.

At block 466, the system stores, as the training instance, the training video and (1) a length of the selected portion of the video (e.g., the number of video frames in the selected portion of the video at block 405); (2) a number of repetitions of the selected portion of the video e.g., the number of periods appended to the training video at block 456 and block 458); and/or (3) a frame wise periodicity indication of the training video (e.g., a frame wise indication of whether a video frame, in the training video, is the portion of the video selected at block 454 representing the repeated activity, or whether a video frame is prepended to the training video at block 462 and/or appended to the training video at block 464).

At block 468, the system determines whether to generate an additional training instance. In some implementations, the system can determine to generate an additional training instance based on whether one or more conditions are satisfied, such as whether a threshold number of training instances have been generated, whether there are additional video(s) to select at block 452, and/or whether one or more additional or alternative conditions has been satisfied. If the system determines to generate an additional training instance, the system proceeds back to block 452 and selects an additional video, before proceeding to blocks 454, 456, 458, 460, 462, and 464 based on the additional selected video. If the system determines to not generate an additional training instance, the process ends.

Figure 5:
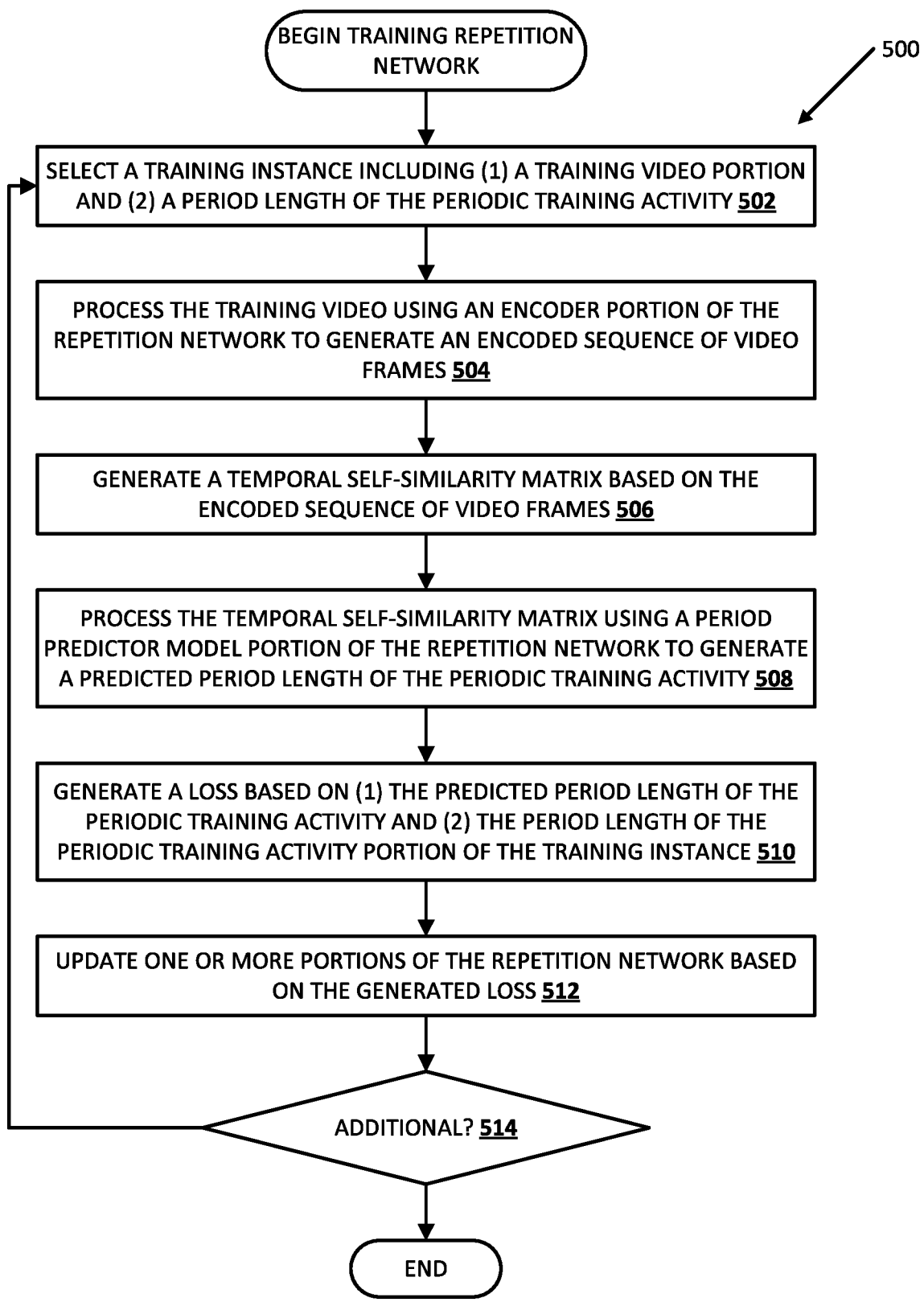
FIG. 5 is a flowchart illustrating an example process of training a repetition network in accordance with various implementations disclosed herein.

FIG. 5 is a flowchart illustrating a process 500 of training a repetition network in accordance with implementations disclosed herein. For convenience, the operations of the flowchart are described with reference to a system that performs the operations. This system may include various components of various computer systems, such as one or more components of computing system 202, and/or computing system 710. Moreover, while operations of process 500 are shown in a particular order, this is not meant to be limiting. One or more operations may be reordered, omitted, and/or added.

At block 502, the system selects a training instance including: a training video capturing a periodic training activity and ground truth periodic output. In some implementations, the ground truth periodic output can include (1) a period length of the periodic training activity, (2) a number of repetitions of the periodic training activity in the training video, and/or (3) a frame wise periodicity indication of the training video. In some implementations, the training instance can be generated in accordance with process 400 of FIG. 4A or process 450 of FIG. 4B.

At block 504, the system processes the training video using an encoder portion of a repetition network, to generate an encoded sequence of video frames.

At block 506, the system generates a temporal self-similarity matrix based on the encoded sequence of video frames. In some implementations, the temporal self-similarity matrix represents a pairwise similarity of each pair of encoded video frames in the sequence of encoded video frames. In some implementations, the temporal self-similarity matrix can be generated by determining a distance measure between each pair of encoded video frames. For example, the distance measure between each pair of encoded video frames can be a Euclidean distance measure, a squared Euclidean distance measure, a negative squared Euclidean distance, a Gaussian distance, and/or a cosine similarity measure. In some implementations, the temporal self-similarity matrix can be generated based on processing the distance measure for each pair of encoded video frames. For example, the temporal self-similarity matrix measure can be generated by processing the distance measure for each pair of encoded video frames, using a row wise Softmax process.

At block 508, the system processes the temporal self-similarity matrix using a period predictor model portion of the repetition network to generate predicted periodic output. In some implementations, the predicted periodic output can include (1) a predicted period length of the periodic training activity, (2) a predicted number of repetitions of the periodic training activity in the training video, and/or (3) a predicted frame wise periodicity indication of the training video At block 510, the system generates a loss based on (1) the predicted periodic output and (2) the ground truth periodic output portion of the training instance.

At block 512, the system updates (e.g., through backpropagation) one or more portions of the repetition network based on the generated loss.

At block 514, the system determines whether to perform additional training on the repetition network. In some implementations, the system can determine to perform more training if there are one or more additional unprocessed training instances and/or if other criterion/criteria are not yet satisfied. The other criterion/criteria can include, for example, whether a threshold number of epochs have occurred and/or a threshold duration of training has occurred. If the system determines to perform additional training, the system proceeds back to block 502, selects an additional training instance, and proceeds to blocks 504, 506, 508, 510, and 512 based on the additional training instance. If not, the process ends. Although process 500 is described with respect to a non-batch learning technique, batch learning may additionally and/or alternatively be utilized.

Figure 6:
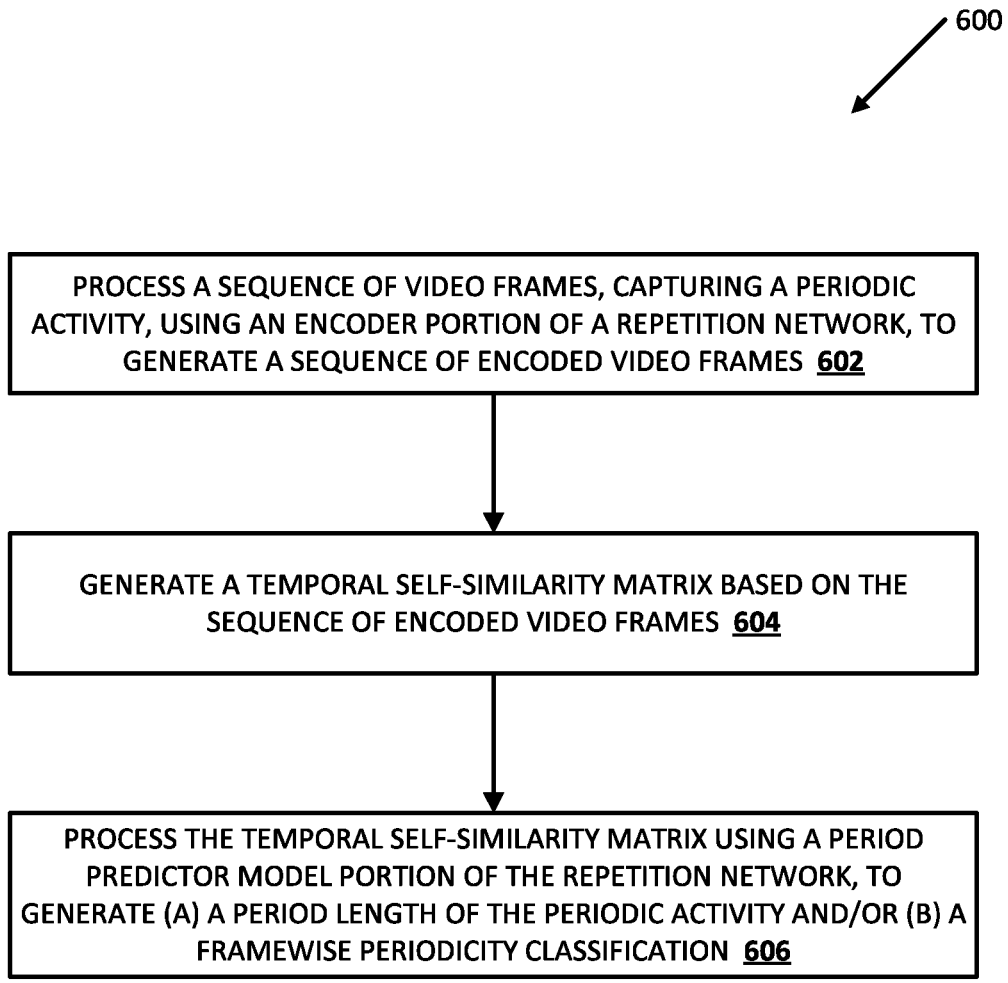
FIG. 6 is a flowchart illustrating an example process of generating a period length of a periodic activity and/or a per frame periodicity classification using a repetition network in accordance with various implementations disclosed herein.

FIG. 6 is a flowchart illustrating a process 600 of processing a sequence of video frames using repetition network to generate (a) a period length of a periodic activity captured in the sequence of video frames and/or (b) a frame wise periodicity classification of the sequence of video frames in accordance with implementations disclosed herein. For convenience, the operations of the flowchart are described with reference to a system that performs the operations. This system may include various components of various computer systems, such as one or more components of computing system 202, and/or computing system 710. Moreover, while operations of process 600 are shown in a particular order, this is not meant to be limiting. One or more operations may be reordered, omitted, and/or added.

At block 602, the system processes a sequence of video frames, capturing a periodic activity, using an encoder portion of a repetition network, to generate a sequence of encoded video frames. In some implementations, the sequence of video frames can be preprocessed using one or more image processing processes. For example, when there are multiple moving things captured in a video (e.g., the video captures two people exercising, the video captures two robots performing a task, etc.), image processing processes can be utilized to track a single moving thing in the sequence of video frames.

At block 604, the system generates a temporal self-similarity matrix based on the sequence of encoded video frames.

At block 606, the system processes the temporal self-similarity matrix using a period predictor model portion of the repetition network, to generate (a) a period length of the periodic activity and/or (b) a frame wise periodicity classification of the sequence of video frames. In some implementations, the system can determine the number of times the periodic activity repeats in the sequence of video frames based on the period length of the periodic activity and/or based on the frame wise periodicity classification of the sequence of video frames.

Figure 7:
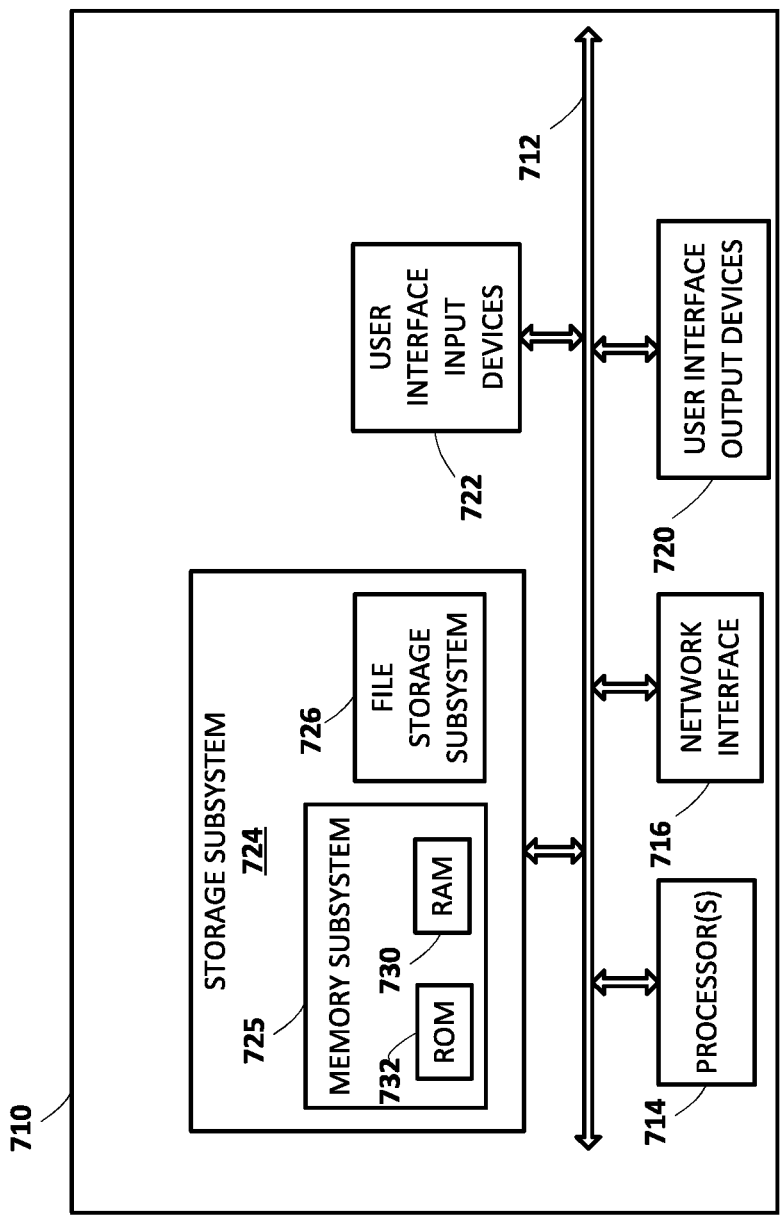
FIG. 7 illustrates an example architecture of a computing device.

FIG. 7 is a block diagram of an example computing device 710 that may optionally be utilized to perform one or more aspects of techniques described herein. In some implementations, one or more of a client computing device, and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of one or more of the processes of FIG. 4A, FIG. 4B, FIG. 5, and/or FIG. 6, as well as to implement various components depicted in FIG. 2.

These software modules are generally executed by processor 714 alone or in combination with other processors. Memory 725 used in the storage subsystem 724 can include a number of memories including a main random access memory ("RAM") 730 for storage of instructions and data during program execution and a read only memory ("ROM") 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

A method implemented by one or more processors is provided, the method including processing a sequence of video frames capturing a periodic activity, using an encoder portion of a repetition network, to generate a sequence of encoded video frames. The method further includes generating, based on the sequence of encoded video frames, a temporal self-similarity matrix indicating a pairwise similarity between encoded video frames in the sequence of encoded video frames. The method further includes processing the temporal self-similarity matrix using a period predictor model portion of the repetition network, to generate (a) a period length of the periodic activity in the sequence of video frames and/or (b) a per frame periodicity classification of the sequence of video frames.

These and other implementations of the technology disclosed herein can include one or more of the following features.

Tin some implementations, the method further includes processing an additional sequence of video frames capturing an additional periodic activity, using the encoder portion of the repetition network, to generate an additional sequence of additional encoded video frames. The method further includes generating, based on the additional sequence of encoded video frames, an additional temporal self-similarity matrix indicating a pairwise similarity between additional encoded video frames in the additional sequence of additional encoded video frames. The method further includes processing the additional temporal self-similarity matrix, using the period predictor model of the repetition network, to generate (a) an additional period length of the additional periodic activity in the additional sequence of video frames and/or (b) an additional per frame periodicity classification of the additional sequence of video frames.

In some implementations, processing the sequence of video frames capturing the periodic activity, using the encoder portion of the repetition network, to generate the sequence of encoded video frames includes, for each video frame in the sequence of video frames, processing the video frame using a convolutional neural network portion of the encoder to generate a two dimensional convolutional features of the video frame. The method further includes processing the two dimensional convolutional features, of the video frame, using a three dimensional convolutional neural network portion of the encoder, to generate temporal context features for the video frame. The method further includes processing the temporal context features, of the video frame, using a max-pooling portion of the encoder, to generate a corresponding the encoded video frame of the sequence of encoded video frames.

In some implementations, generating the temporal self-similarity matrix indicating the pairwise similarity between the encoded video frames, in the sequence of encoded video frames, includes, for each pair of encoded video frames, in the sequence of encoded video frames, determining a distance measure between the pair of encoded video frames. The method further includes generating the temporal self-similarity matrix based on the distance measure between the pair of encoded video frames, for each pair of encoded video frames. In some versions of those implementations, determining the distance measure between the pair of encoded video frames includes, for each pair of encoded video frames, in the sequence of encoded video frames, determining a Euclidean distance, a squared Euclidean distance, a negative squared Euclidean distance, a Gaussian distance, and/or a cosine similarity measure, between the pair of encoded video frames. In some versions of those implementations, generating the temporal self-similarity matrix based on the distance measure between the pair of encoded video frames, for each pair of encoded video frames, includes generating the temporal self-similarity matrix by processing the distance measure between the pair of encoded video frames, for each pair of encoded video frames, using a row-wise Softmax process.

In some implementations, wherein processing the temporal self-similarity matrix using the period predictor model to generate the period length of the periodic activity includes processing the temporal self-similarity matrix using a two dimensional convolutional neural network portion to generate convolutional output. The method further includes processing the convolutional output using a transformer portion to generate transformer output. The method further includes processing the transformer output using a period length classifier to generate the period length of the periodic activity.

In some implementations, wherein the sequence of video frames capturing the periodic activity are a sequence of randomly sampled video frames from a video capturing the periodic activity.

In some implementations, prior to processing the sequence of video frames capturing the periodic activity using the encoder portion of the repetition network, training the repetition network, training the repetition network includes, for each of a plurality of training instances, processing a training sequence of training video frames portion of the training instance, capturing a periodic training activity, using the encoder portion of the repetition network, to generate a training sequence of encoded training video frames. The method further includes generating a training temporal self-similarity matrix indicating a pairwise similarity between encoded training video frames in the training sequence of encoded training video frames. The method further includes processing the training sequence of encoded training video frames using a period predictor model portion of the repetition network, to generate (a) a training period length of the training periodic activity and/or (b) a training per frame periodicity classification of the training sequence of video frames. The method further includes determining a loss based on (1) the training period length of the training periodic activity and/or the training per frame periodicity classification of the training sequence of video frames and (2) a corresponding ground truth portion of the training instance. The method further includes updating one or more portions of the repetition network based on the determined loss. In some versions of those implementations, the training sequence of training video frames portion of at least one of the training instances is a synthetic repetition video.

In some versions of those implementations, the synthetic repetition video is generated based on an unlabeled video, and wherein generating the synthetic repetition video based on an unlabeled video includes selecting a sequence of video frames from the unlabeled video. For each of a plurality of iterations, the method further includes generating the synthetic training video by appending the selected sequence of video frames, in the sequence, to the synthetic repetition video, where the selected sequence of video frames is the synthetic repetition video at an initial iteration. In some versions of those implementations, the synthetic repetition video is generated based on an unlabeled video, and wherein generating the synthetic repetition video based on an unlabeled video includes selecting a sequence of video frames from the unlabeled video. For each of a plurality of iterations, the method further includes generating the synthetic training video by appending the selected sequence of video frames, in the sequence, and appending the selected sequence of video frames, in a reverse sequence, to the synthetic repetition video, wherein the selected sequence of video frames, in the sequence, and the selected sequence of video frames, in the reverse sequence, is the synthetic repetition video in an initial iteration.

In some versions of those implementations, generating the synthetic repetition video further includes selecting an additional sequence of video frames from the unlabeled video, wherein the additional sequence of video frames are immediately preceding the selected sequence of video frames. The method further includes prepending the selected additional sequence of video frames to the beginning of the synthetic repetition video. In some versions of those implementations, generating the synthetic repetition video further includes selecting a further sequence of video frames from the unlabeled video, wherein the further sequence of video frames are immediately following the selected sequence of video frames. The method further includes appending the selected further sequence of video frames to the end of the synthetic repetition video.

In some versions of those implementations, generating the synthetic repetition video further includes processing each frame of the synthetic repetition video using an affine image transformation. In some versions of those implementations, the affine image transformation includes a rotation, a translation, and/or a scale.

In some implementations, the method further includes generating a repetition count of the number of repetitions in the sequence of video frames based on the period length of the periodic activity and/or the per frame periodicity classification of the sequence of video frames.

In some implementations, a method implemented by one or more processors is provided, the method including training a repetition network to generate (a) a period length of the periodic activity in the sequence of video frames and/or (b) a per frame periodicity classification of the sequence of video frames, wherein training the repetition network includes, for each of a plurality of training instances, processing a training sequence of training video frames portion of the training instance, capturing a periodic training activity, using the encoder portion of the repetition network, to generate a training sequence of encoded training video frames. The method further includes generating a training temporal self-similarity matrix indicating a pairwise similarity between encoded training video frames in the training sequence of encoded training video frames. The method further includes processing the training sequence of encoded training video frames using a period predictor model portion of the repetition network, to generate (a) a training period length of the training periodic activity and/or (b) a training per frame periodicity classification of the training sequence of video frames. The method further includes determining a loss based on (1) the training period length of the training periodic activity and/or the training per frame periodicity classification of the training sequence of video frames and (2) a corresponding ground truth portion of the training instance. The method further includes updating one or more portions of the repetition network based on the determined loss.

In some implementations, a method implemented by one or more processors is provided, the method includes generating a synthetic repetition video, wherein generating the synthetic repetition video includes selecting a sequence of video frames from an unlabeled video. For each of a plurality of iterations, the method further includes generating the synthetic training video by (a) appending the selected sequence of video frames, in the sequence, to the synthetic repetition video, where the selected sequence of video frames is the synthetic repetition video at an initial iteration, or (b) appending the selected sequence of video frames, in a reverse sequence, to the synthetic repetition video, wherein the selected sequence of video frames, in the sequence, and the selected sequence of video frames, in the reverse sequence, is the synthetic repetition video in an initial iteration.

These and other implementations of the technology disclosed herein can include one or more of the following features.

In some implementations, the method further includes training a model, using the synthetic training video, to generate (a) a period length of a periodic activity in an additional sequence of video frames and/or (b) a per frame periodicity classification of the additional sequence of video frames.

In some versions of those implementations, training the model, using the synthetic training video, to generate (a) the period length of a periodic activity in the additional sequence of video frames and/or (b) the per frame periodicity classification of the additional sequence of video frames includes processing the synthetic training video using the model to generate (a) a candidate period length of a training periodic length in the synthetic training video and/or (b) a candidate per frame periodicity classification of the synthetic training video. The method further includes determining a loss based on (1) the candidate period length of the synthetic training video and/or the candidate per frame periodicity classification of the synthetic training video and (2) a corresponding ground truth representation of the synthetic training video. The method further includes updating one or more portions of the model based on the determined loss.

In some implementations, a method implemented by one or more processors is provided, the method includes processing a sequence of video frames capturing a periodic activity, using an encoder portion of a repetition network, to generate a sequence of encoded video frames. For each pair of encoded video frames, in the sequence of encoded video frames, the method further includes determining a distance measure between the pair of encoded video frames. The method further includes generating a matrix based on the distance measure between the video frames, for each pair of encoded video frames. The method further includes processing the matrix using a periodic predictor model portion of the repetition network, to generate (a) a period length of the periodic activity in the sequence of video frames and/or (b) a per frame periodicity classification of the sequence of video frames.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the methods described herein. Some implementations also include one or more transitory or non-transitory computer readable storage media storing computer instructions executable by one or more processors to perform any of the methods described herein.

What is claimed is:

1. A method implemented by one or more processors, the method comprising:
    processing a sequence of video frames capturing a periodic activity, using an encoder portion of a repetition network, to generate a sequence of encoded video frames, wherein processing the sequence of video frames capturing the periodic activity, using the encoder portion of the repetition network, to generate the sequence of encoded video frames comprises:
        for each video frame in the sequence of video frames:
            processing the video frame using a first portion of the encoder to generate two dimensional features of the video frame;
            processing the two dimensional features, of the video frame, using a second portion of the encoder, to generate temporal context features for the video frame, and
            processing the temporal context features, of the video frame, using a third portion of the encoder, to generate a corresponding encoded video frame of the sequence of encoded video frames;
    generating, based on the sequence of encoded video frames, a temporal self-similarity matrix indicating a pairwise similarity between encoded video frames in the sequence of encoded video frames; and
    processing the temporal self-similarity matrix using a period predictor model portion of the repetition network, to generate (a) a period length of the periodic activity in the sequence of video frames and/or (b) a per frame periodicity classification of the sequence of video frames.

2. The method of claim 1, further comprising:
    processing an additional sequence of video frames capturing an additional periodic activity, using the encoder portion of the repetition network, to generate an additional sequence of additional encoded video frames;
    generating, based on the additional sequence of encoded video frames, an additional temporal self-similarity matrix indicating a pairwise similarity between additional encoded video frames in the additional sequence of additional encoded video frames; and
    processing the additional temporal self-similarity matrix, using the period predictor model of the repetition network, to generate (a) an additional period length of the additional periodic activity in the additional sequence of video frames and/or (b) an additional per frame periodicity classification of the additional sequence of video frames.

3. The method of claim 1, wherein generating the temporal self-similarity matrix indicating the pairwise similarity between the encoded video frames, in the sequence of encoded video frames, comprises:
    for each pair of encoded video frames, in the sequence of encoded video frames:
        determining a distance measure between the pair of encoded video frames; and
        generating the temporal self-similarity matrix based on the distance measure between the pair of encoded video frames, for each pair of encoded video frames.

4. The method of claim 3, wherein determining the distance measure between the pair of encoded video frames comprises:
    for each pair of encoded video frames, in the sequence of encoded video frames:
        determining a Euclidean distance, a squared Euclidean distance, a negative squared Euclidean distance, a Gaussian distance, and/or a cosine similarity measure, between the pair of encoded video frames.

5. The method of claim 4, wherein generating the temporal self-similarity matrix based on the distance measure between the pair of encoded video frames, for each pair of encoded video frames, comprises:
    generating the temporal self-similarity matrix by processing the distance measure between the pair of encoded video frames, for each pair of encoded video frames, using a row-wise Softmax process.

6. The method of claim 5, wherein processing the temporal self-similarity matrix using the period predictor model to generate the period length of the periodic activity comprises:
    processing the temporal self-similarity matrix using a two dimensional convolutional neural network portion to generate convolutional output;
    processing the convolutional output using a transformer portion to generate transformer output; and
    processing the transformer output using a period length classifier to generate the period length of the periodic activity.

7. The method of claim 6, wherein the sequence of video frames capturing the periodic activity are a sequence of randomly sampled video frames from a video capturing the periodic activity.

8. The method of claim 7, further comprising:
    prior to processing the sequence of video frames capturing the periodic activity using the encoder portion of the repetition network, training the repetition network, wherein training the repetition network comprises:
        for each of a plurality of training instances:
            processing a training sequence of training video frames portion of the training instance, capturing a periodic training activity, using the encoder portion of the repetition network, to generate a training sequence of encoded training video frames;
            generating a training temporal self-similarity matrix indicating a pairwise similarity between encoded training video frames in the training sequence of encoded training video frames; and
            processing the training sequence of encoded training video frames using a period predictor model portion of the repetition network, to generate (a) a training period length of the training periodic activity and/or (b) a training per frame periodicity classification of the training sequence of video frames;

determining a loss based on (1) the training period length of the training periodic activity and/or the training per frame periodicity classification of the training sequence of video frames and (2) a corresponding ground truth portion of the training instance; and updating one or more portions of the repetition network based on the determined loss.

9. The method of claim 8, wherein the training sequence of training video frames portion of at least one of the training instances is a synthetic repetition video.

10. The method of claim 9, wherein the synthetic repetition video is generated based on an unlabeled video, and wherein generating the synthetic repetition video based on an unlabeled video comprises:

selecting a sequence of video frames from the unlabeled video; and for each of a plurality of iterations:
generating the synthetic training video by appending the selected sequence of video frames, in the sequence, to the synthetic repetition video, where the selected sequence of video frames is the synthetic repetition video at an initial iteration.

11. The method of claim 9, wherein the synthetic repetition video is generated based on an unlabeled video, and wherein generating the synthetic repetition video based on an unlabeled video comprises:

selecting a sequence of video frames from the unlabeled video;

for each of a plurality of iterations:
generating the synthetic training video by appending the selected sequence of video frames, in the sequence, and appending the selected sequence of video frames, in a reverse sequence, to the synthetic repetition video, wherein the selected sequence of video frames, in the sequence, and the selected sequence of video frames, in the reverse sequence, is the synthetic repetition video in an initial iteration.

12. The method of claim 11, wherein generating the synthetic repetition video further comprises:

selecting an additional sequence of video frames from the unlabeled video, wherein the additional sequence of video frames are immediately preceding the selected sequence of video frames; and prepending the selected additional sequence of video frames to the beginning of the synthetic repetition video.

13. The method of claim 12, wherein generating the synthetic repetition video further comprises:

selecting a further sequence of video frames from the unlabeled video, wherein the further sequence of video frames are immediately following the selected sequence of video frames; and appending the selected further sequence of video frames to the end of the synthetic repetition video.

14. The method of claim 13, wherein generating the synthetic repetition video further comprises:

processing each frame of the synthetic repetition video using an affine image transformation.

15. The method of claim 14, wherein the affine image transformation includes a rotation, a translation, and/or a scale.

16. The method of claim 15, further comprising:

generating a repetition count of the number of repetitions in the sequence of video frames based on the period length of the periodic activity and/or the per frame periodicity classification of the sequence of video frames.

17. A method implemented by one or more processors, the method comprising:

training a repetition network to generate (a) a period length of the periodic activity in the sequence of video frames and/or (b) a per frame periodicity classification of the sequence of video frames, wherein training the repetition network comprises:

for each of a plurality of training instances:
processing a training sequence of training video frames portion of the training instance, capturing a periodic training activity, using the encoder portion of the repetition network, to generate a training sequence of encoded training video frames, wherein processing the training sequence of training video frames, using the encoder portion of the repetition network, to generate a sequence of encoded training video frames comprises:

for each training video frame in the sequence of training video frames:
processing the training video frame using a first portion of the encoder to generate two dimensional features of the training video frame, and
processing the two dimensional features, of the training video frame, using a second portion of the encoder, to generate temporal context features for the training video frame, and
processing the temporal context features, of the training video frame, using a third portion of the encoder, to generate a corresponding encoded training video frame of the sequence of encoded training video frames;

generating a training temporal self-similarity matrix indicating a pairwise similarity between encoded training video frames in the training sequence of encoded training video frames; and processing the training sequence of encoded training video frames using a period predictor model portion of the repetition network, to generate (a) a training period length of the training periodic activity and/or (b) a training per frame periodicity classification of the training sequence of video frames;

determining a loss based on (1) the training period length of the training periodic activity and/or the training per frame periodicity classification of the training sequence of video frames and (2) a corresponding ground truth portion of the training instance; and updating one or more portions of the repetition network based on the determined loss.

18. A method implemented by one or more processors, the method comprising:

generating a synthetic repetition video, wherein generating the synthetic repetition video comprises:

selecting a sequence of video frames from an unlabeled video;

identifying one or more video frames, in the unlabeled video, that are immediately preceding the selected sequence of video frames;

generating an initial portion of the synthetic repetition video based on the one or more video frames that are immediately preceding the selected sequence of video frames in the unlabeled video;

for a plurality of iterations and until one or more conditions are satisfied, appending one or more video frames, of the selected sequence of video frames, to the synthetic repetition video; and generating an ending portion of the synthetic repetition video based on one or more video frames that are immediately subsequent to the selected sequence of video frames in the unlabeled video.

19. The method of claim 18, further comprising:

training a model, using the synthetic training video, to generate (a) a period length of a periodic activity in an additional sequence of video frames and/or (b) a per frame periodicity classification of the additional sequence of video frames.

20. The method of claim 19, wherein training the model, using the synthetic training video, to generate (a) the period length of a periodic activity in the additional sequence of video frames and/or (b) the per frame periodicity classification of the additional sequence of video frames comprises:

processing the synthetic training video using the model to generate (a) a candidate period length of a training periodic length in the synthetic training video and/or (b) a candidate per frame periodicity classification of the synthetic training video;

determining a loss based on (1) the candidate period length of the synthetic training video and/or the candidate per frame periodicity classification of the synthetic training video and (2) a corresponding ground truth representation of the synthetic training video; and updating one or more portions of the model based on the determined loss.

21. The method of claim 18, wherein appending the one or more video frames, of the selected sequence of video frames, to the synthetic repetition video comprises:

in a first iteration, of the plurality of iterations, appending the sequenced sequence of video frames, in the sequence, to the synthetic repetition video; and in a second iteration, of the plurality of iterations, appending the selected sequence of video frames, in the sequence, to the synthetic repetition video.

22. The method of claim 18, wherein appending the one or more video frames, of the selected sequence of video frames, to the synthetic repetition video comprises:

in a first iteration, of the plurality of iterations, appending the selected sequence of video frames, in the reverse sequence, to the synthetic repetition video; and in a second iteration, of the plurality of iterations, appending the selected sequence of video frames, in the reverse sequence, to the synthetic repetition video.

23. The method of claim 18, wherein appending the one or more video frames, of the selected sequence of video frames, to the synthetic repetition video comprises:

in a first iteration, appending one or more of the selected frames, in the sequence, to the synthetic repetition video; and in a second iteration, appending one or more of the selected frames, in the reverse sequence of the first iteration, to the synthetic repetition video.

* * * * *